US009892545B2

(12) United States Patent
Benko et al.

(10) Patent No.: US 9,892,545 B2
(45) Date of Patent: Feb. 13, 2018

(54) FOCUS GUIDANCE WITHIN A THREE-DIMENSIONAL INTERFACE

(71) Applicant: MICROSOFT TECHNOLOGY LICENSING, LLC, Redmond, WA (US)

(72) Inventors: Hrvoje Benko, Seattle, WA (US); Daniel Chaim Robbins, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/752,008

(22) Filed: Jun. 26, 2015

(65) Prior Publication Data

US 2015/0302632 A1 Oct. 22, 2015

Related U.S. Application Data

(62) Division of application No. 13/530,808, filed on Jun. 22, 2012, now Pat. No. 9,098,111.

(51) Int. Cl.
*G06T 15/08* (2011.01)
*G06F 3/01* (2006.01)
*G06F 3/0481* (2013.01)
*H04N 13/04* (2006.01)

(52) U.S. Cl.
CPC ............ *G06T 15/08* (2013.01); *G06F 3/013* (2013.01); *G06F 3/017* (2013.01); *G06F 3/04815* (2013.01); *H04N 13/0495* (2013.01); *H04N 13/0497* (2013.01)

(58) Field of Classification Search
None
See application file for complete search history.

(56) References Cited

U.S. PATENT DOCUMENTS

| 6,021,403 | A | 2/2000 | Horvitz et al. |
| 6,608,615 | B1 | 8/2003 | Martins |
| 7,554,541 | B2 * | 6/2009 | Fitzmaurice ....... G02B 27/2271 345/424 |
| 7,743,340 | B2 | 6/2010 | Horvitz et al. |
| 7,886,236 | B2 | 2/2011 | Kolmykov-Zotov et al. |
| 7,920,144 | B2 | 4/2011 | Vogt et al. |
| 7,956,869 | B1 * | 6/2011 | Gilra ..................... G06F 3/0481 345/157 |

(Continued)

OTHER PUBLICATIONS

"Non Final Office Action Issued in U.S. Appl. No. 13/530,808", dated Nov. 13, 2014, 24 Pages.

(Continued)

*Primary Examiner* — Nicholas R Wilson
(74) *Attorney, Agent, or Firm* — Shook, Hardy & Bacon, L.L.P.

(57) ABSTRACT

Methods, systems, and computer-readable media providing focal feedback and control in a three-dimensional display. Focal anchors are provided at different depths and used to determine at what depth the user is currently focusing. The focal anchors are also used to receive input from the user. By looking at a focal anchor, the use can cause the portion of content associated with the focal anchor to be displayed more prominently relative to content displayed at different depths. In one embodiment, predictive feedback is provided at a depth associated with one of the focal anchors.

20 Claims, 11 Drawing Sheets

(56) References Cited

U.S. PATENT DOCUMENTS

| | | | |
|---|---|---|---|
| 8,711,061 B2 | 4/2014 | Reichow et al. | |
| 2002/0010571 A1 | 1/2002 | Daniel et al. | |
| 2010/0265204 A1 | 10/2010 | Tsuda | |
| 2011/0175932 A1* | 7/2011 | Yu | G06F 3/048 345/661 |
| 2011/0216075 A1* | 9/2011 | Shigeta | G06F 3/017 345/473 |
| 2011/0320949 A1* | 12/2011 | Ohki | G06F 17/245 715/727 |
| 2012/0254781 A1* | 10/2012 | Larsen | G06F 3/0481 715/765 |

OTHER PUBLICATIONS

"Notice of Allowance Issued in U.S. Appl. No. 13/530,808", dated Apr. 2, 2015, 12 Pages.

Deng, et al., "Predictive Display System for Tele-manipulation using Image-Based Modeling and Rendering", In Proceedings of the IEEE/RSJ International Conference on Intelligent Robot and Systems, vol. 3, Oct. 27, 2003, 6 Pages.

Hornof, et al., "Cognitive Strategies and Eye Movements for Searching Hierarchical Computer Displays", In Proceedings of the SIGCHI Conference on Human Factors in Computing Systems, Apr. 5, 2003, 8 Pages.

Hutchinson, et al., "Human-Computer Interaction Using Eye-Gaze Input", In IEEE Transactions on Systems, Man and Cybernetics, vol. 19, Issue 6, Nov. 1989, pp. 1527-1538.

Igarashi, et al., "A Suggestive Interface for 3D Drawing", In Proceedings of the 14th Annual ACM Symposium on User Interface Software and Technology, Nov. 11, 2001, 9 Pages.

Ji, et al., "Non-intrusive Eye and Gaze Tracking for Natural Human Computer Interaction", In MMI-Interaktiv Eye Tracking, vol. 1, Issue No. 6, Mar. 2003, pp. 1-14.

Laszlo, et al., "Predictive Feedback for Interactive Control of Physics-based Characters", In Proceedings of Eurographics, vol. 24, Issue 3, Aug. 29, 2005, 9 Pages.

Manituk, et al., "Gaze-Dependent Depth-of-Field Effect Rendering in Virtual Environments", In Serious Games Development and Applications,Lecture Notes in Computer Science vol. 6944, Sep. 19, 2011, 12 Pages.

Meyers, et al., "Application of Video-Based Technology for the Simultaneous Measurement of Accommodation and Vergence", Vision Research, Elsevier Ltd., Jun. 2006, 9 Pages.

Ohshima, et al., "Gaze-Directed Adaptive Rendering for Interacting with Virtual Space", In Proceedings of the IEEE, Virtual Reality International Symposium, Mar. 30, 1996, pp. 103-110.

Vercher, et al., "Oculo-Manual Coordinallon Control: Ocular and Manual Tracking at Visual Targets With Delayed Visual Feedback of the Hand Motion", In Experimental Brain Research, Sep. 1992, vol. 90, Issue No. 3, pp. 599-609.

Yerex, et al., "Predictive Display Models for Tele-Manipulation from uncalibrated Camera-Capture of Scene Geometry and Appearance", In IEEE International Conference on Robotics and Automation, vol. 2, Sep. 14, 2003, 6 Pages.

* cited by examiner

FOCUS GUIDANCE WITHIN A THREE-DIMENSIONAL INTERFACE

RELATED APPLICATIONS

This application is a divisional of U.S. patent application Ser. No. 13/530,808, filed on Jun. 22, 2012, titled FOCUS GUIDANCE WITHIN A THREE-DIMENSIONAL INTERFACE, which application is herein incorporated by reference.

BACKGROUND

Computing devices provides feedback to help a user understand the result of an action taken or, prospectively, what will happen. Traditionally, predictive feedback is presented in 2-D space. Limited screen space makes providing helpful predictive feedback a challenge without obscuring the interface with the predictive feedback. The goal of predictive feedback is to help the user understand a potential result of an action. A message explaining (or demonstrating) what happens when an icon is selected is a simple example of predictive feedback. These messages are usually very brief to avoid using much screen space.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide feedback within a three-dimensional user interface. The 3-D user interface may display focal anchors within different volumes of three-dimensional space. The focal anchors may provide feedback that guides a user's focus to an associated volume of the interface. Different volumes of the interface may provide different content. For example, one volume of the interface may provide predictive feedback that helps the user understand the consequences of a proposed action within a main interface. Thus, the focal anchors may guide the user's focus to the predictive feedback within a volume of the interface and then back to the main content a few moments after the feedback is presented. The interface may draw a user's attention to a particular focal anchor by changing an appearance of the focal interface, for example by causing it to flash, brighten, etc.

The focal anchors may also serve as a user input. The user may manipulate the interface by looking at different focal anchors. The interface may respond to the user looking at the focal anchor by improving the visibility of content associated with the focal anchor. Thus, the user may change the appearance of the content in a volume of the interface by looking at the three-dimensional anchor associated with that volume.

The focal anchors work using gaze detection, which determines the direction the eyes are looking. The interface displays the focal anchors far enough apart from one another that the interface may determine which anchor the user is gazing at. For example, when it is determined through gaze detection that the user is looking at a focal anchor within a particular three-dimensional volume then content in other volumes may become translucent or be removed entirely to improve the user's ability to focus on content within the relevant three-dimensional volume. Embodiments of the invention may also measure eye vergence or accommodation to determine what the user is viewing or on what the user is focusing. These techniques may be used instead of or in combination with gaze detection. The 3-D anchors may remain visible at all times even when content within other volumes of three-dimensional space are temporarily removed.

BRIEF DESCRIPTION OF THE DRAWINGS

Embodiments of the invention are described in detail below with reference to the attached drawing figures, wherein.

DETAILED DESCRIPTION

Figure 1:
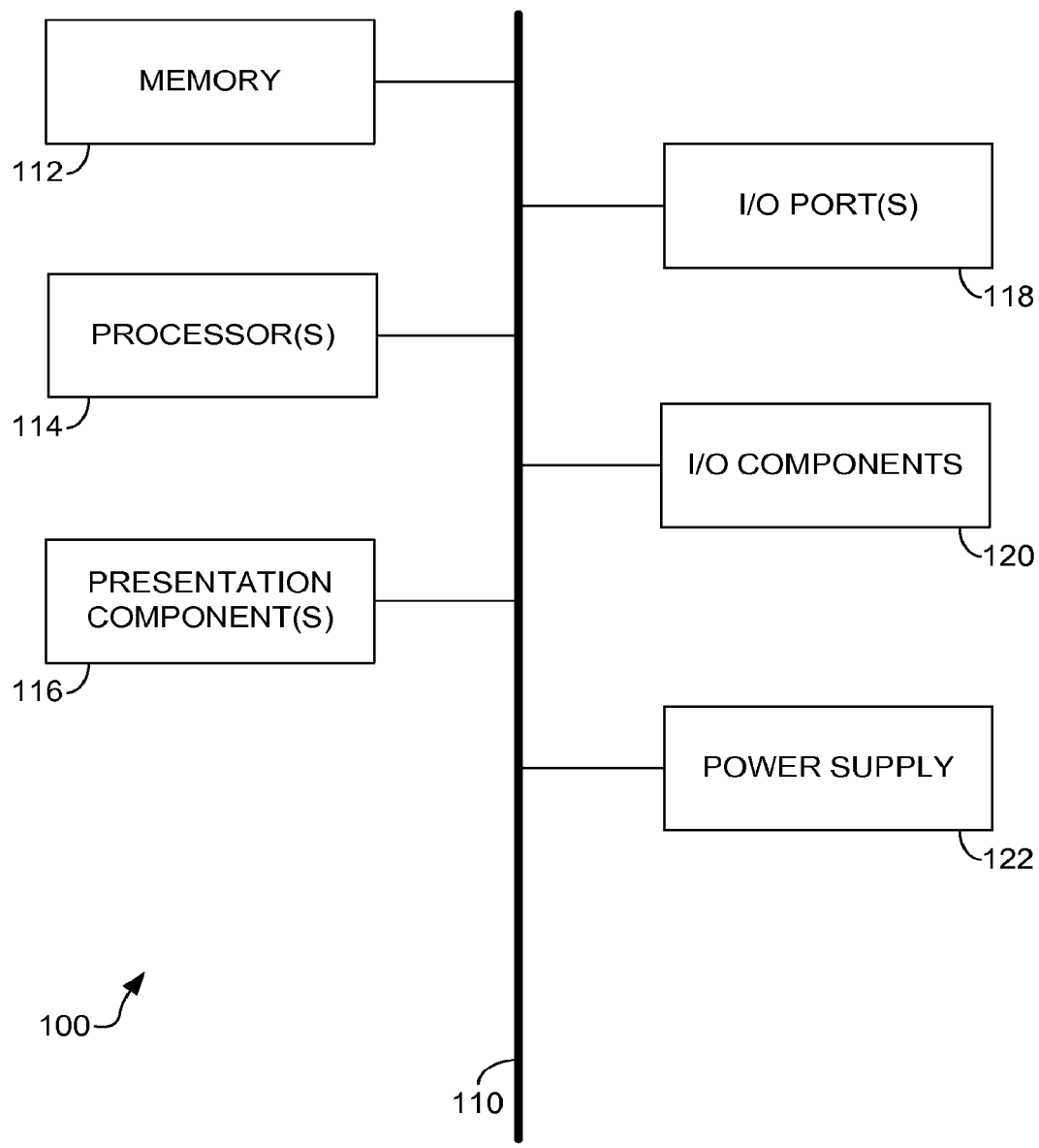
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention describe a three-dimensional user interface that provides different content within different volumes of the interface. The 3-D user interface includes focal anchors that are displayed within different volumes of three-dimensional space. The focal anchors may be used to provide feedback that guides a user's focus to an associated volume of the interface. Different volumes of the interface may provide different content. For example, one volume of the interface may provide predictive feedback that helps the user understand the consequences of a proposed action within a main interface. In another embodiment, the historical information may be provided to show a previous version of the interface, for example, in the game context, to show where an enemy used to be standing. Thus, the focal anchors may be used to guide the user's focus to the metadata, scene versions, or other content that is added to a 3-D volume within the interface.

While most embodiments of the invention are described within this description in the single user context for the sake of simplicity, embodiments are not limited to single user scenarios. For example, embodiments of the invention may work when two or more users are co-located near each other while viewing a single display. In another example, the display is a multiplexed display that sends different 3-D views to different users that are viewing the display from meaningfully different depths. In another embodiment, users may be in physically different locations with different displays and input devices.

Embodiments of the present invention use gaze detection, which determines the direction the eyes are looking, to make adjustments to the three-dimensional interface. For example, when it is determined through gaze detection that the user is looking at a focal anchor within a particular three-dimensional volume then content in other volumes may become translucent or be removed entirely to improve the user's ability to focus on content within the relevant three-dimensional volume. In this way, the user may manipulate the interface by looking at different 3-D anchors. The 3-D anchors may remain visible at all times even when content within other volumes of three-dimensional space are temporarily removed. This way, the user may restore the content in a different volume by looking at the three-dimensional anchor associated with that volume. Embodiments of the invention may also measure eye vergence or accommodation to determine what the user is viewing or on what the user is focusing. These techniques may be used instead of or in combination with gaze detection.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-storage media. By way of example, and not limitation, computer-storage media may comprise Random Access Memory (RAM); Read Only Memory (ROM); Electronically Erasable Programmable Read Only Memory (EEPROM); flash memory or other memory technologies; Compact Disk Read-Only Memory (CDROM), digital versatile disks (DVDs) or other optical or holographic media; magnetic cassettes, magnetic tape, magnetic disk storage or other magnetic storage devices. The computer-storage media may be non-transitory.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Embodiments of the present invention work with displays that generate three-dimensional interfaces. In one embodiment, the three-dimensional interface is generated in three physical dimensions, not in two dimensions. For example, the image may be comprised of voxels, not pixels. This application will refer to displays that render objects in three dimensions as volumetric displays. Portions of volumetric interfaces are described as interface volumes. Examples of volumetric displays include holographic displays, mutiplanar displays, rotating panel displays, a laser generated in 3D, and integral imaging. The volumetric display may render images in three-dimensions to the unaided human eye.

Figure 2:
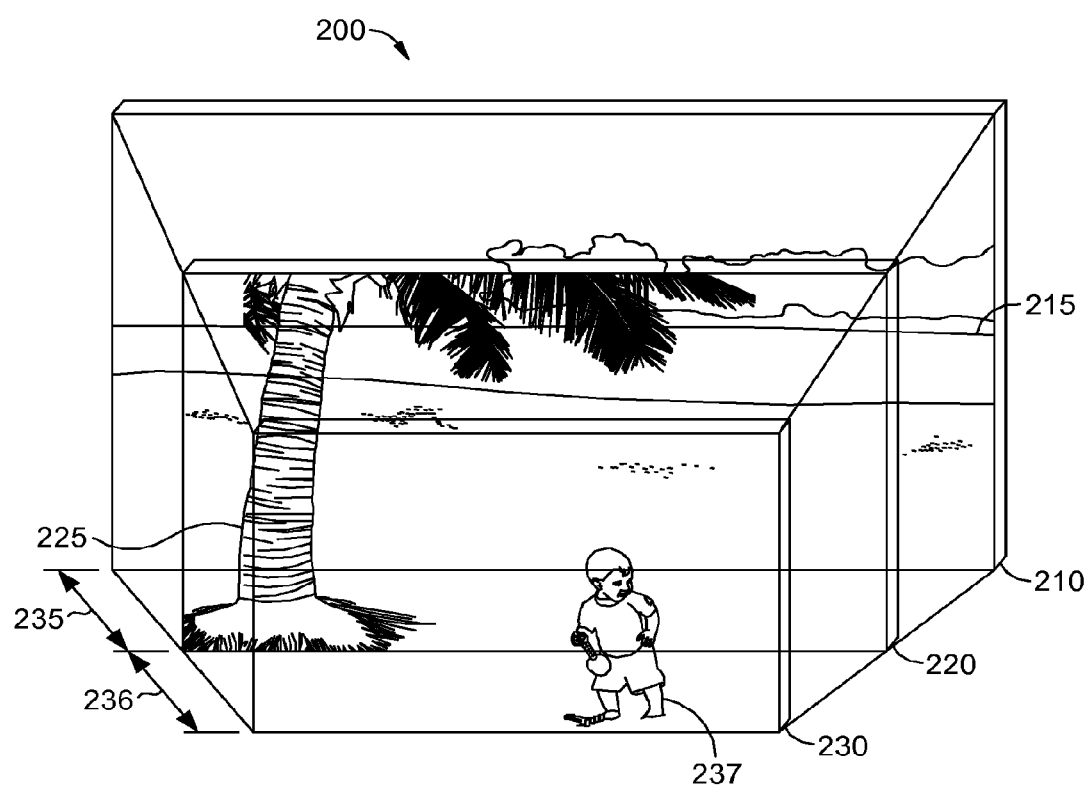
FIG. 2 is a diagram of a volumetric display device suitable for implementing embodiments of the invention.

In FIG. 2, an exemplary a volumetric display device 200 is depicted, in accordance with an embodiment of the present invention. The exemplary device 200 comprises three different transparent user interfaces stacked on top of each other, but at different distances from the user. In one embodiment, the transparent user interfaces are liquid crystal displays built on a transparent substrate. Each display may have its own drivers, electronics, power source, and processors (not shown) to drive the display. In this case, the display 200 comprises a first layer 210, a second layer 220, and a third layer 230. The first layer 210 displays a beach scene 215. The second layer 220 depicts a palm tree 225 and the third layer depicts a child 237. The first layer 210 is a distance 235 from the second display layer 220. The second display layer 220 is a distance 236 from the third display layer 230. Distances 235 and 236 may be different.

Figure 3:
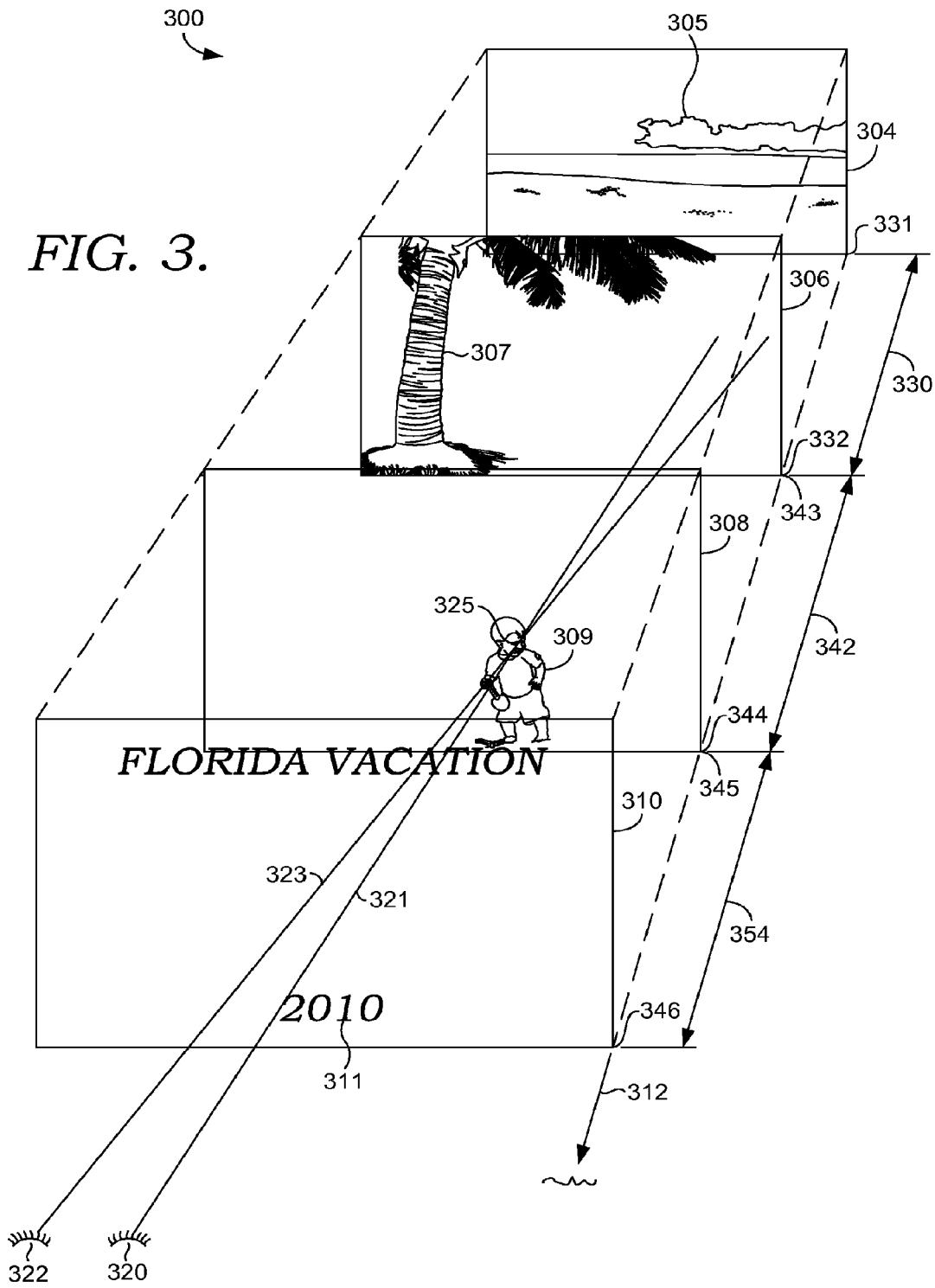
FIG. 3 is a diagram depicting an exemplary three-dimensional display area generated by a volumetric display device, in accordance with an embodiment of the present invention.

FIG. 3 is an illustration depicting an exemplary three-dimensional display area 300 generated by a volumetric display device, such as the one depicted in FIG. 2. The display area 300 includes objects that exist in three dimensions and planar objects that may simulate depth. The three-dimensional display area 300 comprises four different volumes. Each volume appears as a cube for the sake of illustration. The first three-dimensional display volume 304 is defined by a focal range 330 that runs from focal point 331 to focal point 332. The first display volume 304 depicts a beach and cloud scene 305. In the example shown, the cloud scene 305 appears to be projected onto a plane at the back of the three-dimensional volume. This is consistent with one embodiment of the present invention where the interface comprises content displayed on a series of focal planes that are separated by some distance. However, embodiments of the present invention are not limited to displaying content within a plane. For example, the interface may project an image throughout a portion of, or all of, a display volume. Further, a single object such as a snake or a cloud could transition between multiple volumes of space.

Display volume 306 is defined by a second focal range 342 running from focal point 343 to focal point 344. The second focal range 342 may be a different length than focal range 330. The second display volume 306 depicts a palm tree 307. While the Z dimension of the display volume 306 is defined by focal range 342, the X and Y dimensions of the volume are defined by the viewable area projected by the device generating the user interface.

The third display volume 308 is defined by a third focal range 334 that runs from focal point 345 to focal point 346. Display volume 308 depicts a child 309. The child 309 is intended to be shown as an object projected within the volume rather than on a plane at the back of the third three-dimensional volume.

The fourth volume 310 starts at point 346 and ends at the user. The third display volume displays text 311 "Florida vacation 2010."

Generally, a user focuses on an object by converging the sight lines of their eyes on the object. The sight line from a user's eyes are depicted within FIG. 3. The right eye 320 and the left eye 322 of the user are depicted at the bottom of the figure. As can be seen, sight lines 323 and 321 converge at focus point 325, which is near object 309. Thus, the object 309 would be in focus to a user. The tree 307 and the beach scene 305 could be somewhat out of focus. Similarly, the Florida vacation text 311 may also be out of focus. The degree to which objects outside of the focal point 325 are out of focus depends on the various focal ranges used by the display. The focal ranges may mimic the characteristics of the real world or use different metrics to achieve an artistic or didactic goal.

Figure 4:
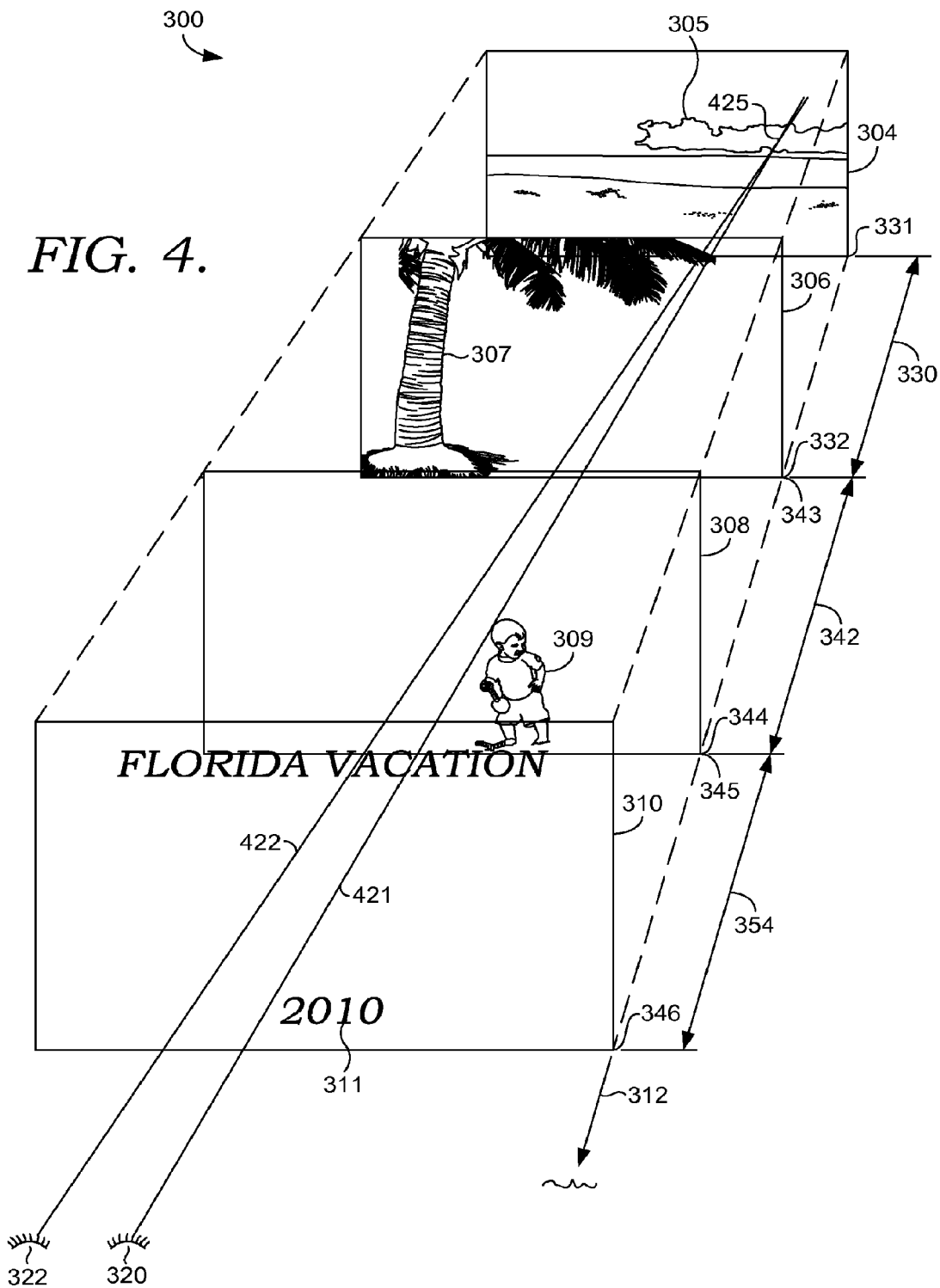
FIG. 4 is a diagram showing a focal adjustment by the user on a three-dimensional interface, in accordance with an embodiment of the present invention.

Turning now to FIG. 4, a focal adjustment by the user on a three-dimensional interface is illustrated, in accordance with an embodiment of the present invention. As can be seen, FIG. 4 is essentially similar to FIG. 3 described previously. However, the user has changed their focus to converge on point 425, which is within the first display volume 304. As can be seen, sight lines 421 and 422 converge at point 425. Several measurable changes occur to the user's eyes when their focus changes. The muscles in the eye may change the shape of the eye to adjust the focus. Changing the shape of the eye and eye lens may be described as accommodation. Adjusting the focus of far away objects depends mostly on accommodation. When focusing on closer objects, the vergence (rotation of the eyes in their respective sockets) is the eye's primary focus mechanism. Vergence and accommodation may be measured by eye sensors. For example, vergence may be measured by a camera with a view of the eyes. Embodiments of the invention may measure a single eye or both eyes.

Figure 5:
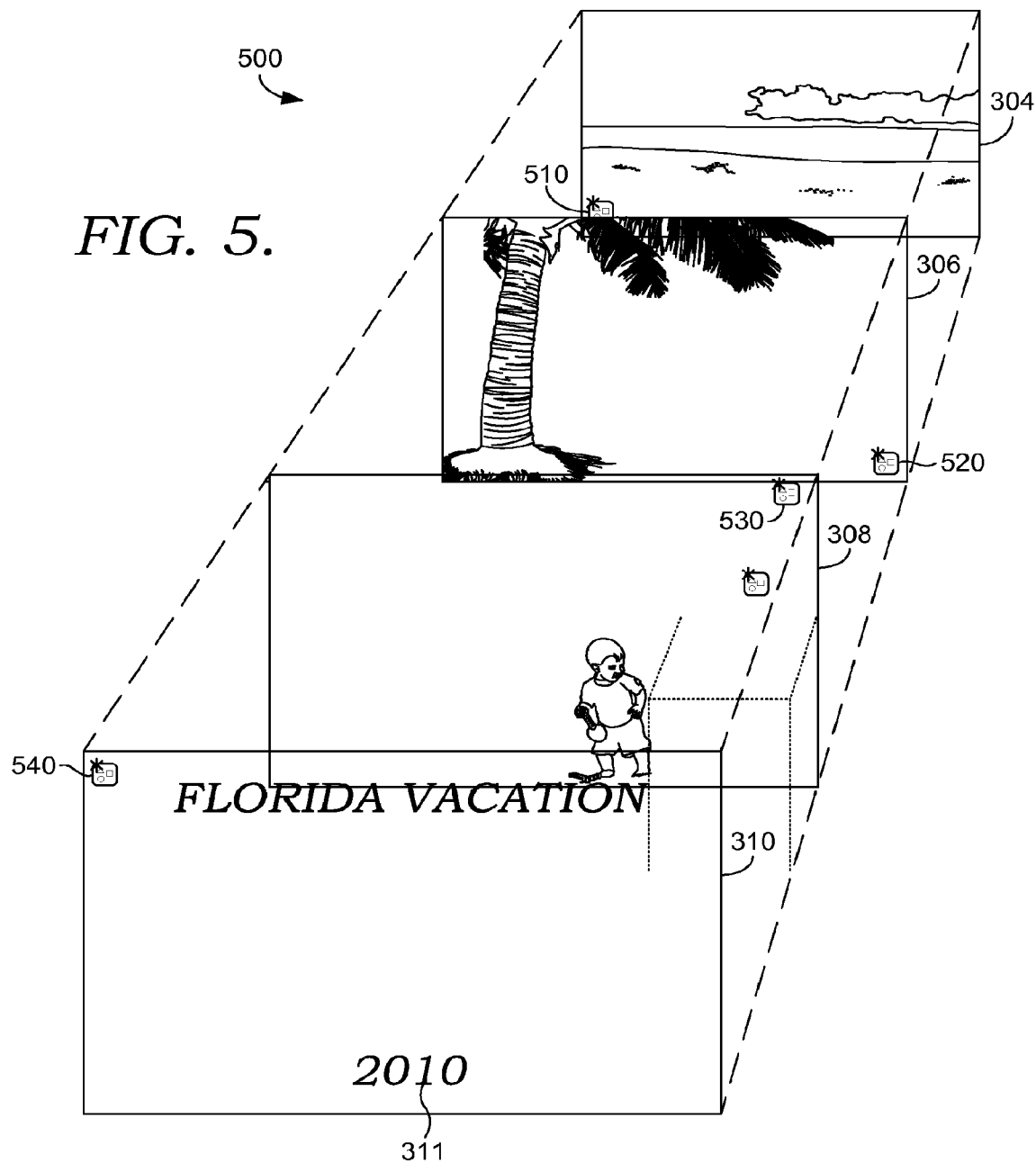
FIG. 5 is a diagram showing focal anchors within a three-dimensional display, in accordance with an embodiment of the present invention.

Turning now to FIG. 5, focal anchors within a three-dimensional display are illustrated, in accordance with the present invention. As can be seen, the three-dimensional display depicted in FIG. 5 is similar to the display described previously with reference to FIG. 3. However, a focal anchor has been added to each volume. Volume 304 includes focal anchor 510 at the bottom left-hand corner of the volume. Though depicted as a two-dimensional icon, focal anchor 510 could be a bar or other object that is displayed throughout the volume 304 from point 331 to point 332.

The second display volume 306 comprises a focal anchor 520. The third display volume 308 comprises a focal anchor 530 and the fourth display volume 310 includes focal anchor 540. In one embodiment, the focal anchor is displayed at the same focal distance from the user as the primary content displayed within the relevant display volume. Thus, the focal anchors 510 and 520 may be displayed adjacent to a plane towards the back of the display volume. Focal anchor 530 may be displayed at a focal distance that is at a depth consistent with where the child 309 is displayed.

Embodiments of the present invention can determine which focal anchor the user is looking at by examining the user's gaze. A user's gaze is measured by determining where the user is looking. As can be seen from FIG. 5, the anchors within each volume are depicted in opposite corners of the interface to improve the accuracy of the gaze detection. In one embodiment, the focal anchors and content are arranged to prevent gaze overlap between content and an anchor. In other words, various gaze points are reserved for only the focal anchors. However, embodiments of the present invention are not limited to displaying the volume anchors in opposite corners or reserving gaze points.

Figure 6:
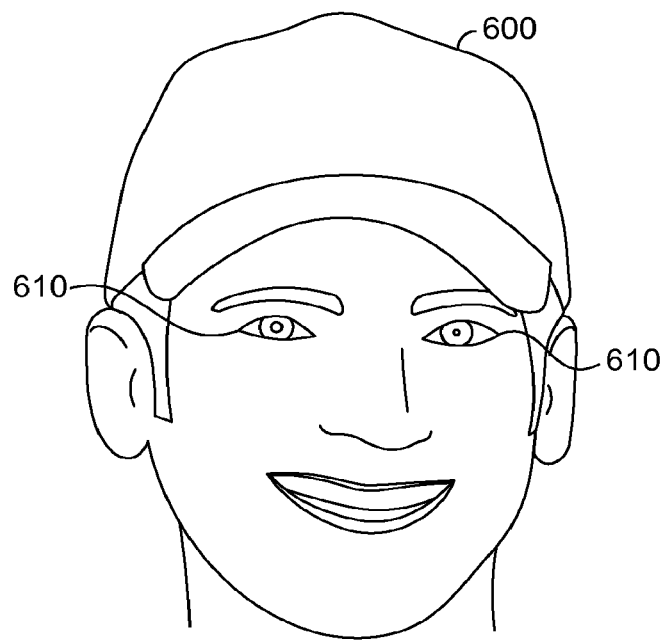
FIG. 6 is a diagram illustrating gaze detection, in accordance with an embodiment of the present invention.
Figure 7:
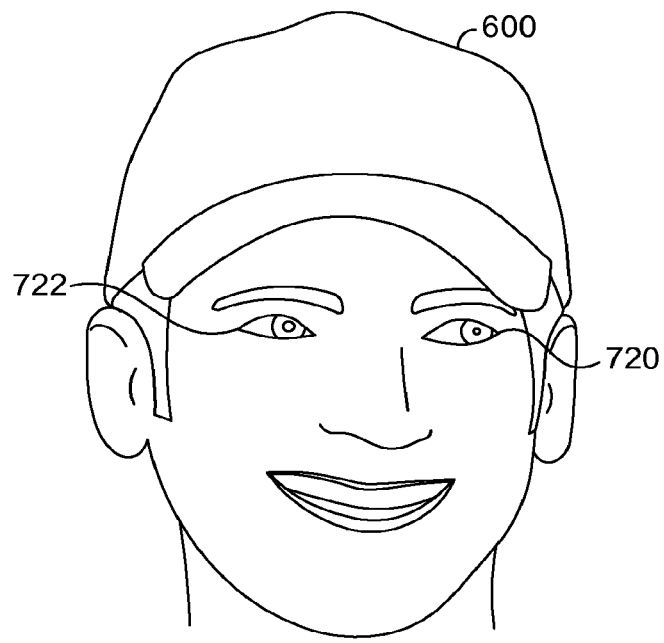
FIG. 7 is a diagram illustrating gaze detection, in accordance with an embodiment of the present invention.

Turning now to FIGS. 6 and 7, gaze detection and gaze change is illustrated. Gaze detection determines where the user is looking by tracking eye movement and converting the eye movement to a gaze direction. In one embodiment, eye movement is tracked by analyzing the pupil movement in one or both eyes. Different devices may be used to track eye movement. In one embodiment, a camera is used to track the movement of the center of the pupil. Infrared light may be used to locate a corneal reflection. A vector is calculated between the center of the pupil and the reflection to determine gaze. The user may need to go through a calibration routine for gaze detection to be effective. In one embodiment, the user gazes at each focal anchor within an interface and provides an input indicating when the user is looking at a particular focal anchor. This information is then used to identify the user's gaze by tracking subsequent movement. The calibration routine may need to be repeated if the user or interface move greater than a threshold calibration distance. User movement may be detected by a camera or other device. If greater than the threshold movement occur, then the user may be asked to repeat the calibration routine.

In FIG. 6, the user 600 is looking more or less straight ahead as can be seen from the user's eyes 610 and 612. In FIG. 7, the user's gaze has moved to the side as can be seen from the new direction of the user's eyes 720 and 730. The user's gaze may be detected by a camera mounted in front of the user. In one embodiment, the one or more cameras used to detect the user's gaze are mounted on the device generating the three-dimensional user interface. The cameras may also be used to detect gestures made by the user. In another embodiment, the camera is mounted on the users head with a view of the user's eyes. While a user's gaze may change as the eyes move from side to side, the user's gaze may also change as the user's eyes rotate as the user adjusts focus.

In addition to gaze detection, accommodation detection may be used to determine what the user is viewing. Accommodation occurs when eye muscles change the shape of the eye to adjust the user's focus. The change in the eye shape may be detected by a head mounted sensor or other sensor capable of detecting changes in eye shape. As with gaze detection, the accommodation detection may use calibration. The user may be asked to focus on points at several different depths and provide an indication when focusing at each depth. The calibration points may correspond with the focal anchors. A user's focus may be extrapolated between points to more closely ascertain the user's focus. Accommodation detection may be used in combination with gaze detection. In one embodiment, the calibration routine includes all focal anchors. In this way, the user's gaze and accommodation can be combined to determine when the user is viewing a focal anchor.

Figure 8:
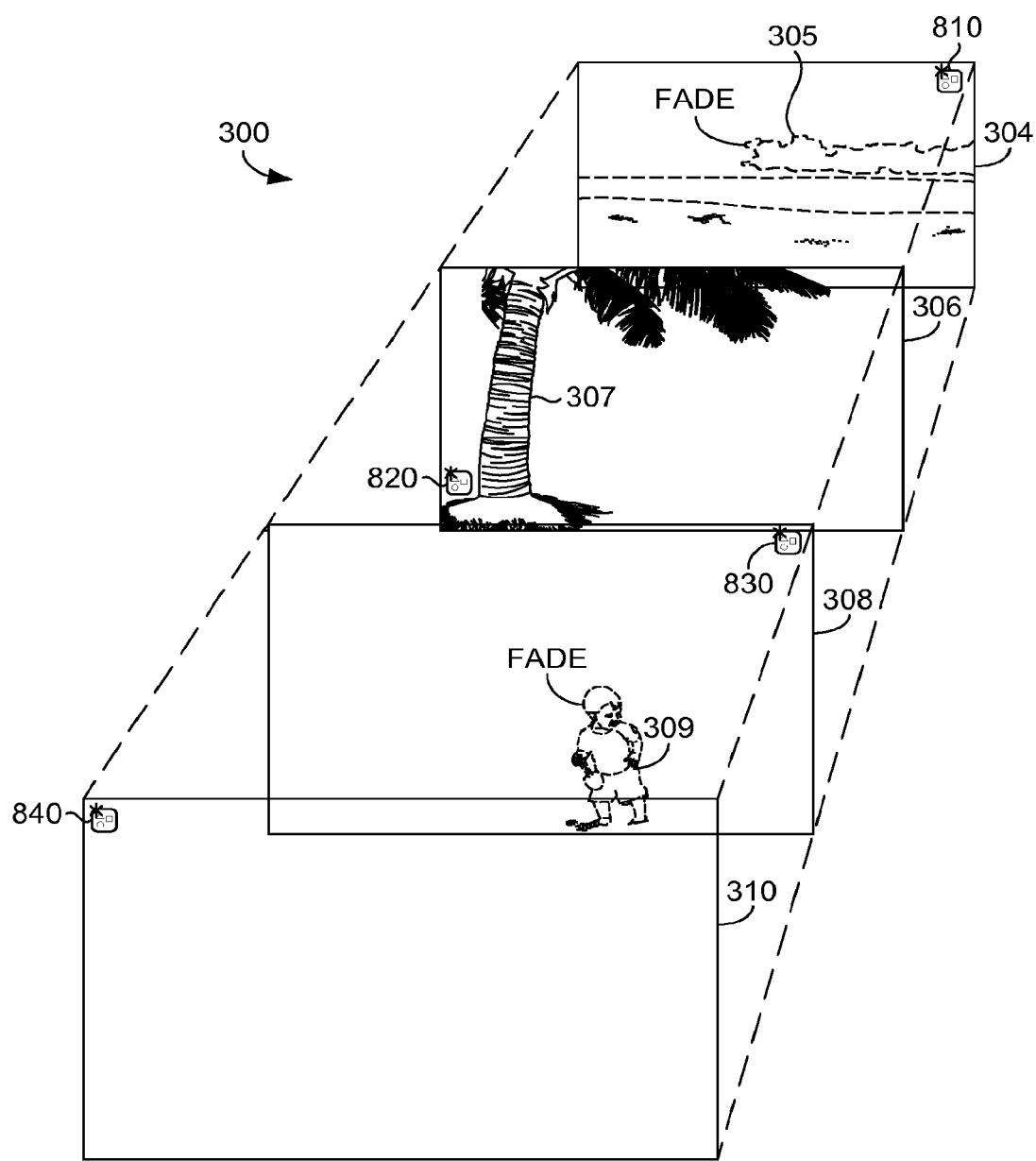
FIG. 8 is a diagram illustrating an interface that is controlled by the user's gaze, in accordance with an embodiment of the present invention.

Turning now to FIG. 8, an interface that is controlled by the user's gaze is illustrated, in accordance with an embodiment of the present invention. As can be seen, the interface depicted in FIG. 8 is similar to the interface depicted in FIG. 3. In the illustration shown, it is determined that the user's gaze is looking at focal anchor 820. In response to determining that the user's gaze is directed at focal anchor 820, objects in the other display volumes are either removed or faded. As can be seen, the text "Florida Vacation 2010" has been removed from display volume 310 that was shown previously in FIG. 3. The child 309 has been faded by increasing the translucency of the child 309. The tree 307 remains unchanged within display volume 306. And similarly, the beach scene 305 within display volume 304 has been faded. In one embodiment, objects within display volumes between the user and the display volume indicated by the user's gaze (referred to as an active volume or depth) are removed, while those behind the indicated display volume are only diminished. In another embodiment, objects in focal planes between the user and the display volume on which the user's gaze is directed are removed, except those objects within the display volume directly on top of the selected display volume. In yet another embodiment, objects in other focal planes are diminished based on a closeness of relationship to objects in the active focal plane. In this case, the closer the relationship, the less the objects are diminished. In yet another embodiment, only objects within other focal planes that occlude content in an active volume are diminished. In other words, content that is not likely to confuse the user's focus or block their view of an active object is left alone and only content blocking the user's view of content in an active volume is altered.

Images/content within non-focal volumes may be diminished several different ways. For example, the rendering style may be changed for the image, the image fidelity may be changed, the image could blurred, the images color may be changed to make it less prominent, and the level of detail may be decreased.

In some embodiments, the focal anchors and content may have overlapping gaze points. When the focal anchor and content share a gaze point, embodiments of the invention may determine that the user is viewing a focal anchor by combining gaze with focus detection, such as accommodation or vergence detection. Thus, the interface may first determine that a focal anchor shares a gaze point with other content. Upon making this determination, the interface may transition into a joint-detection mode that uses other methods to determine what the user is viewing, either alone or in combination with gaze detection. Upon determining the user is viewing a focal anchor, the interface may be manipulated accordingly, for example by emphasizing content in the volume associated with the viewed focal anchor.

In one embodiment, when overlapping gaze points are detected the focal points are cycled to different locations within their designated volume. To manipulate the interface using the moving focal anchors, the user follows the focal anchor with their gaze as the focal anchor moves. In one embodiment, the focal anchor is moved to a point in the volume that does not share a gaze point with content shown in other volumes.

Eye gestures may be performed by the user to select a focal anchor. For example, the user may perform an eye gesture, such as rolling their eyes upward away from the display, and then down to a focal anchor. Once the eye-roll gesture is detected, the interface will interpret subsequent eye movements as the user trying to select a focal anchor. The gesture may also activate a volume selection mode. Once in selection mode, the next focal anchor the user views will be considered as selected regardless of whether the focal anchor shares a gaze point with other content. In other words, once in selection mode, the next focal anchor the user views is interpreted as an attempted selection. In one embodiment, instead of viewing a focal anchor, in selection mode, the user may focus on a volume as a way to select that volume. Once selected, the appearance of content in the volume may be enhanced. Detection of volume selection may use vergence and accommodation detection.

Figure 9:
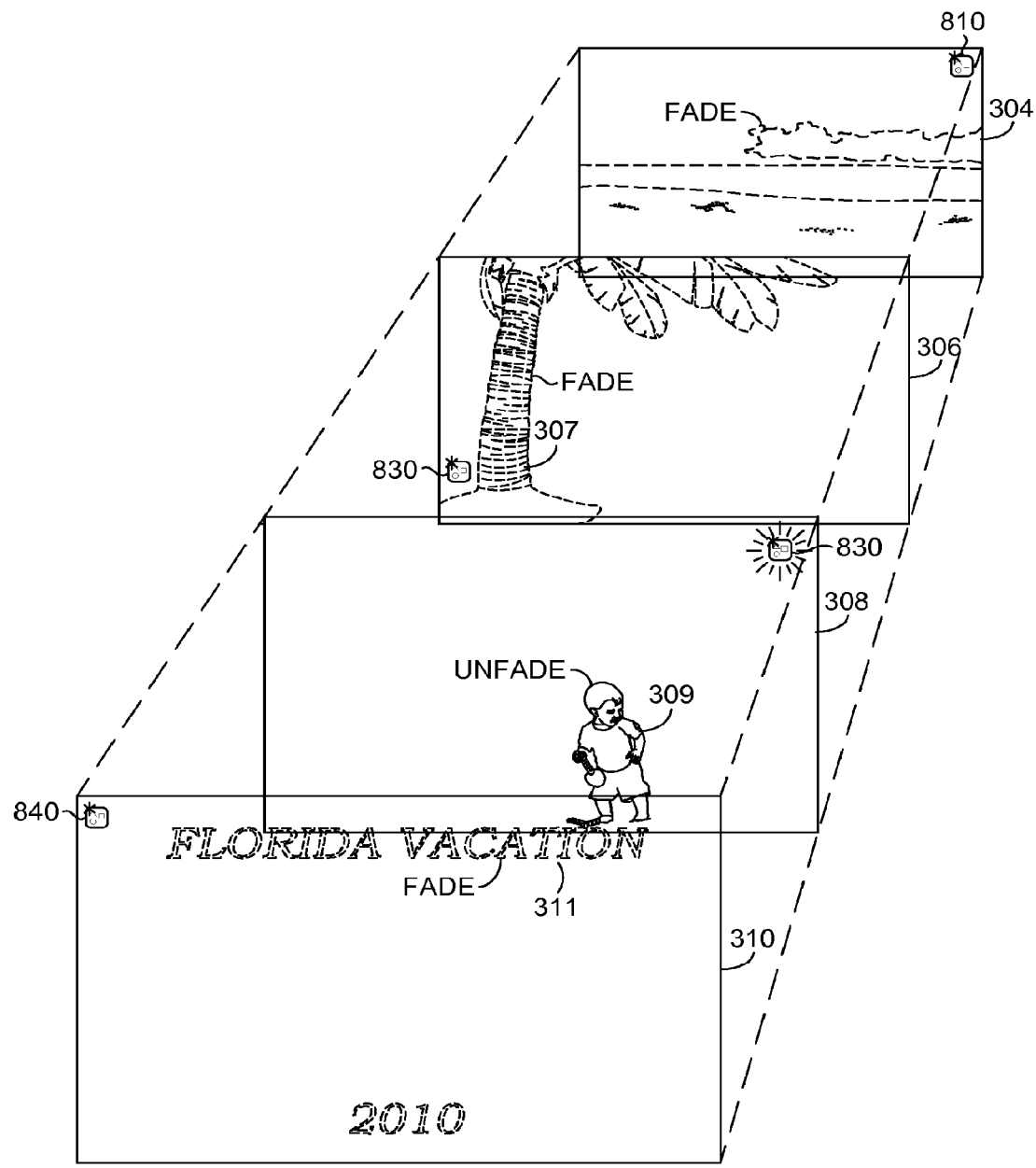
FIG. 9 is a diagram illustrating use of focal anchors to draw a user's attention to a particular volume, in accordance with an embodiment of the present invention.

Turning now to FIG. 9, use of focal anchors to draw a user's attention to a particular volume is illustrated, according to an embodiment of the present invention. In FIG. 9, focal anchor 830 is flashing as depicted by the dash lines. Upon determining that the user's gaze is directed at focal point 830, the objects in the other display volumes may fade and the object within display volume 308 may be restored, if it had been previously faded. Again, fading is only one example of how the content could be diminished. In this case, the child 309 is unfaded while the palm tree 307 is faded. In this case, the text Florida Vacation 311 within volume 310 is restored, but in faded. Restoring previously removed objects in display volumes before and after a selected display volume allows a user to see those other objects even if they are not in perfect focus to the user. In one embodiment of the invention, the objects depicted in different volumes are related by their closeness to each other. For example, in one embodiment a sequence of dance moves that a user is to perform as part of a game are depicted in different three-dimensional volumes. The user may scroll through these dance moves by adjusting their focus on different planes. The user may gaze at a desired focal point or focal anchor and the display can be adjusted to remove illustrated dance steps in planes in front of or behind the desired dance step is displayed.

As mentioned, in some embodiments, the focal anchors and content may have overlapping gaze points. In this case, the anchors may be manipulated to enable their continued function. For example, when an anchor is being used to draw the user's attention to a particular volume it may flash or cycle between different points within the desired volume. The determination that the focal anchor has caught the user's attention may be made by combining gaze detection with accommodation and vergence detection when content and focal anchors share a gaze point.

Figure 10:
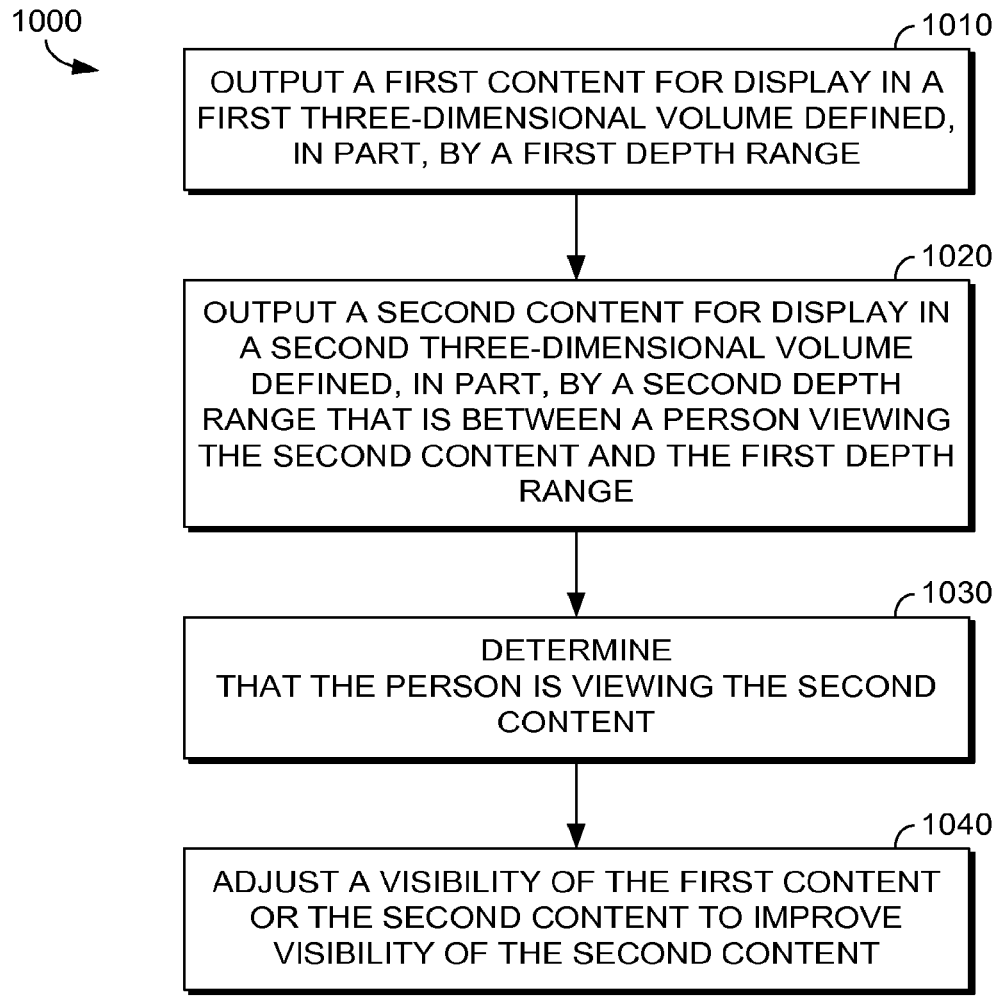
FIG. 10 is a flow chart showing a method of providing multiple channels of information in three-dimensional space, in accordance with an embodiment of the present invention.

Turning now to FIG. 10, a method 1000 of providing multiple channels of information in three-dimensional space is shown, in accordance with an embodiment of the present invention. The method 1000 may be implemented with a device capable of generating a volumetric three-dimensional display, as described previously.

At step 1010, a first content is output for display in a first three-dimensional volume defined, in part, by a first depth range. As mentioned previously, the range may run from the eyes of a user viewing the display to the back of the display. In this case, the range may be thought of as the Z dimension the extents of the volume in the X and Y direction are defined by the capabilities of the display device. Embodiments of the present invention are primarily concerned with volumes at different ranges, because the range has the largest impact on how much a person needs to adjust their focus as objects are further or nearer from them in the Z direction. For example, a user's hand directly in front of their face may be in focus while an object several feet away is out of focus. As the user adjusts their focus on to the object three feet away their hand in front of their face becomes out of focus.

At step 1020, a second content is output for display in a second three-dimensional area defined, in part, by a second depth range that is between a person viewing the second content and the first content. For example, taking FIG. 3 as an illustration, the first three-dimensional volume could correspond volume 304 and the second three-dimensional volume could correspond to volume 306, which is in front of volume 304.

At step 1030, the person is determined to be viewing the second content. In one embodiment, the user is determined to be viewing the second content because the user first gazes at a focal anchor associated with the second content. The first content within the first volume may have its own focal anchor associated with it. Other volumes apart from the first and second volume mentioned previously may have their own focal anchors displayed at a depth consistent with the volume. Accommodation or vergence detection may also be used to determine what the user is viewing, in some embodiments.

At step 1040, in response to determining the person's eyes are focusing on the second content, visibility of the first content or the second content is adjusted to improve the visibility of the second content. For example, the first content's visibility could be reduced to emphasize the second content, even without changing characteristics of the second content. In another example, the second content's visibility is improved by reducing the translucency on the second content. A combination of reducing the visibility of the first content and increasing the visibility of the second content is also possible.

As mentioned previously, the focal anchors in the first and second volume may be located in opposite corners or otherwise far enough apart that a person's gaze towards an anchor may be differentiated from gazing at another anchor or at the primary content displayed within a volume. In one embodiment, the focal anchors are displayed along the edges of the display volume. Further, a buffer may be added between the anchor and the content to help determine when a user's gaze is on the content and when it is on the anchor. A person's gaze may be determined using a camera that has a view of the user's eyes, as described with reference to FIGS. 6 and 7.

In one embodiment, the first content is a primary content such as a movie, productivity program, website, or video game. The second content is out-of-band information that annotates the primary display content. For example, the second content may be a help interface. In the video game context, the secondary content could be a director's cut or additional scene information. In the game scenario, the secondary content could be play tips, a friends brag video, or communications received (e.g., social feed, email, text, phone call).

In one embodiment, the second content depicts a gesture that can be recognized by a computing device to perform an action on the first content. The gesture display may be a form of predictive feedback and used to train the user how to make relevant gestures. For example in a game setting, the secondary content may show the user how to make a gesture that controls a newly introduced game element, such as a new weapon or character function. The gesture could also control an action within a productivity application such as a word processor, spreadsheet, email application, picture application, or presentation application. In one embodiment, the gesture is a 3-D gesture received by a camera without the user touching a physical interface. In another embodiment, the gesture shows the user how to touch a touch screen in a certain way to make an appropriate gesture or to affect a certain action.

Figure 11:
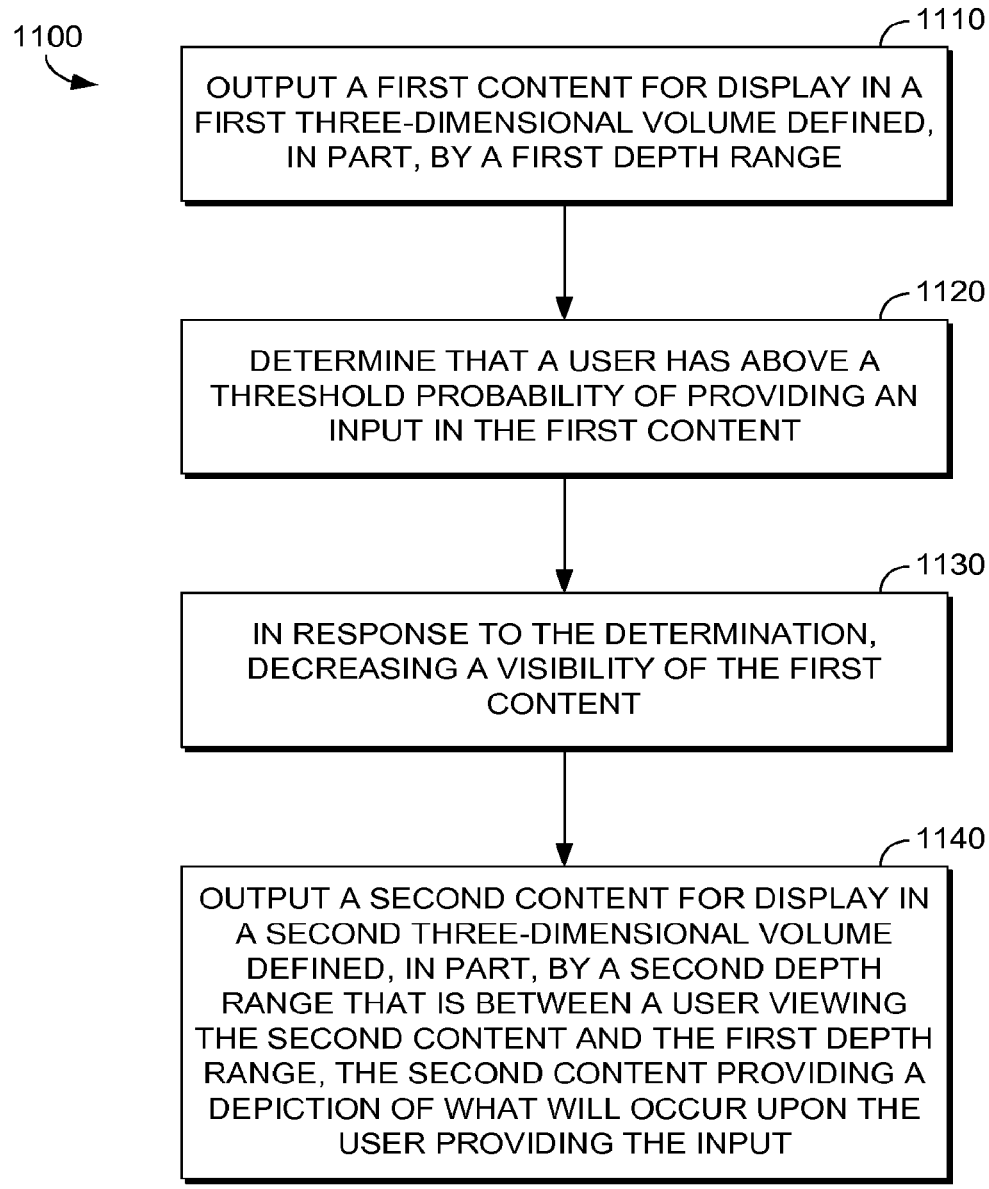
FIG. 11 is a flow chart showing a method of providing multiple channels of information at different depths, in accordance with an embodiment of the present invention.

Turning now to FIG. 11, a method 1100 of providing multiple channels of information at different depths is shown, in accordance to the embodiment of the invention. At step 1110, a first content is output for display in a first three-dimensional volume defined, in part, by a first depth range. In one embodiment, the first content is a primary display, as explained previously. The primary display is associated with the main media content or application to which the user is giving their present attention.

At step 1120, a user is determined to have above a threshold probability of providing an input related to the first content. For example, a user may be moving their hand towards an input button on the touch screen. At some point, the user's hand gets close enough to a particular input that the threshold probability is reached. The user's previous interactions with the interface may also be taken into consideration. For example, as a user approaches a frequently used input, the threshold probability may be reached while the input mechanism, be it a hand or other input device such as a mouse, is further from the familiar input than when approaching an unused input.

In one embodiment, the input is a series of gestures made by the user. As the user draws to the close of the sequence of gestures the threshold probability could be reached. In another embodiment, the input is touching a touch screen in a pattern consistent with a gestures. In this case, the probability could be based on the user touching the screen in a manner consistent with the current trajectory of the user's hand. In another embodiment, the threshold probability is determined apart from any observed user interaction and is entirely based on a prediction of the user's intent taking into consideration the user's previous behaviors and available options. In yet another embodiment, the threshold probability is determined to be reached when the user actually provides a first input such as selecting a delete button, but has yet to select a confirmation or secondary input. In this scenario, the user could provide an input to delete content or move content to a different folder or send an email or text and have yet to provide a confirmation. The feedback shown in the second content could illustrate what happened when the confirmation is provided. The second content could, in effect, be a confirmation screen.

At step 1130, in response to the determination, a visibility of the first content is decreased. At step 1140, a second content is output for display in a second three-dimensional volume defined, in part, be a second depth range that is between a user viewing the second content and the first depth range. The second content provides a depiction of what will occur upon the user providing the input. In a case where a confirmation is required, the depiction may assume a yes input. Or a yes confirmation. For example, if the user had selected a series of emails or other objects and pushed the delete button then the second content could be an animation showing the files flying to a recycle bin. The second content will be easier for the user to focus on because the first content's visibility has been decreased in step 1130.

When the input is a partially performed gesture the second content could be an animation of the complete gesture and an animation showing what will occur to the primary content upon completion of the gesture. In one embodiment, the first content is still visible through the second content. In other words, the second content has a degree of translucency that allows the primary content to be viewed, though it may be out of focus to the user when they are viewing the second content. As described previously, the user may restore the original interface by gazing at a focal anchor that is associated with the first content or first volume. Upon detecting that the user has gazed at the focal anchor the secondary content may be removed or diminished and the primary content's visibility restored to regular viewing parameters.

Figure 12:
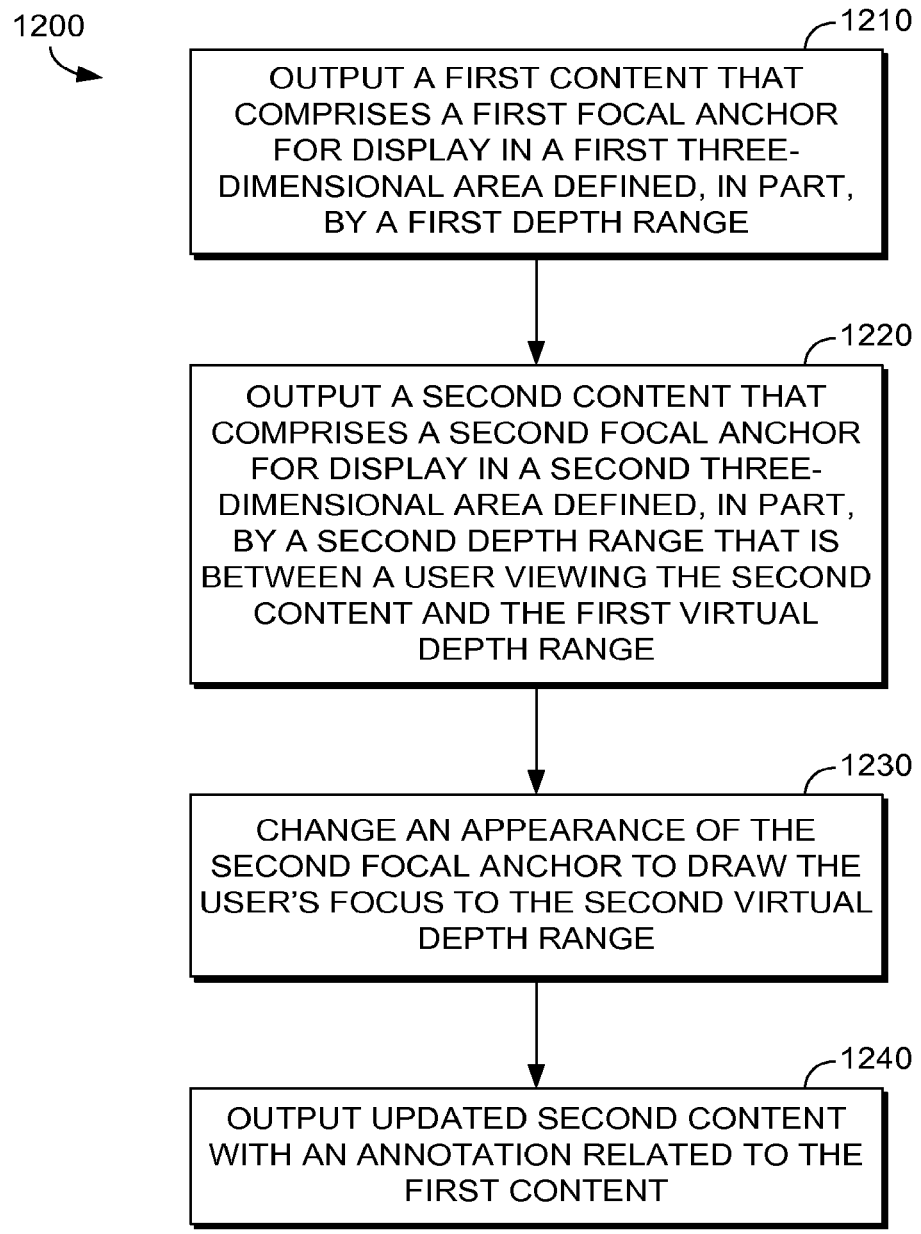
FIG. 12 is a flow chart showing a method for providing focal anchors in different depths of three-dimensional display space to draw a user to elements displayed at a desired depth, in accordance with an embodiment of the present invention.

Turning now to FIG. 12, a method 1200 for providing focal anchors in different depths of three-dimensional display space to draw a user to elements displayed at a desired depth is shown, in accordance with the embodiment of the present invention. As mentioned previously, method 1200 may be performed using a volumetric three-dimensional display.

At step 1210, a first content that comprises a first focal anchor is output for display in a first three-dimensional volume defined, in part, by a first depth range. The first focal anchor may be displayed at the edge of the first volume. For example, the first focal anchor may be displayed in the lower left hand corner of the first three-dimensional volume. The focal anchor may be displayed at a depth range in the middle of the volume or at a depth adjacent to the content shown within the first volume. For example, if the first content is displayed at the back of the first depth range than the focal anchor may also be displayed towards the back of the first depth range.

At step 1220, a second content that comprises a second focal anchor is output for display in a second three-dimensional volume defined, in part, by a second depth range that is between a user viewing the second content and the first virtual depth range. In other words, the second volume is in front of the first content and has the potential to block the first content. The second focal anchor is displayed within the second volume at a point where the user's gaze is able to be distinguished between the first focal anchor and the second focal anchor. For example, the focal anchors could be displayed in opposite corners on opposite sides of the display. With displays that have multiple volumes, the focal anchors associated with each display volume may be arranged so that differentiation of a viewer's gaze is possible.

At step 1230, an appearance of the second focal anchor is changed to draw the user's focus to the second virtual depth range. For example, the second focal anchor may begin to flash or otherwise change colors. An audible sound vibration or other output may be combined with the change in appearance to further emphasize the change and to draw the user's attention.

At step 1240, updated second content is output with an animation and annotation related to the first content. In other words, the second content may provide help information or other supplemental information related to the primary content. As this information changes, the user's attention may be drawn to it through the second focal anchor. Using the second focal anchor also helps the user to focus their eyes on the second content. The user's ability to view the second content may be enhanced by decreasing the visibility of the first content and increasing the opacity of the second content so that it includes the first content at least temporarily. Once the user's gaze is directed back to the first focal anchor the second content may be removed or the visibility diminished by, for example, increasing the translucency to that the first or primary content is again viewable.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more computer-storage hardware media having computer-executable instructions embodied thereon that when executed by a computing device perform a method of providing multiple channels of information at different depths, the method comprising,
    outputting a first content for display in a first three-dimensional volume defined, in part, by a first depth range;
    determining that a user has above a threshold probability of providing an input in the first content, wherein the input includes at least the user moving a hand towards an input button on a touch screen, wherein the above the threshold probability is based on a distance between the hand of the user and the input button, wherein the distance increases based on a past use of the input button by the user;
    before the input is provided, in response to the determination, decreasing a visibility of the first content, wherein the decreasing the visibility of the first content includes the first content being out of focus; and
    before the input is provided, outputting a second content for display in a second three-dimensional volume defined, in part, by a second depth range that is between the user viewing the second content and the first depth range, the second content providing a depiction of what will occur upon the user providing the input.

2. The media of claim 1, wherein the visibility of the first content is decreased by blurring the first content.

3. The media of claim 1, wherein the visibility of the first content is decreased by decreasing the first content's level of detail.

4. The media of claim 1, wherein the depiction is animation showing changes to information depicted within the first content.

5. The media of claim 1, wherein the input is a current hand pose of the hand of the user landing on the touch screen at a point consistent with a current trajectory of the hand of the user.

6. The media of claim 1, wherein the input is a gesture that the user begins to make and the depiction displays a full version of the gesture and changes that will occur if the gesture is completed.

7. The media of claim 1, wherein the first content is visible through the second content.

8. The media of claim 1, wherein the method further comprises: receiving an indication that the input is completed; and decreasing the visibility of the second content and increasing the visibility of the first content.

9. A method of providing multiple channels of information at different depths, the method comprising,
- outputting a first content for display in a first three-dimensional volume defined, in part, by a first depth range;
- determining that a user has above a threshold probability of providing an input in the first content, wherein the input includes at least the user moving a hand towards an input button on a touch screen, wherein the above the threshold probability is based on a distance between the hand of the user and the input button, wherein the distance increases based on a past use of the input button by the user;
- before the input is provided, in response to the determination, decreasing a visibility of the first content, wherein the decreasing the visibility of the first content includes the first content being out of focus; and
- before the input is provided, outputting a second content for display in a second three-dimensional volume defined, in part, by a second depth range that is between the user viewing the second content and the first depth range, the second content providing a depiction of what will occur upon the user providing the input.

10. The method of claim 9, wherein the visibility of the first content is decreased by decreasing the first content's level of detail.

11. The method of claim 9, wherein the visibility of the first content is decreased by blurring the first content.

12. The method of claim 9, wherein the input is a current pose of the hand of the user landing on a touch screen at a point consistent with a current trajectory of the hand of the user.

13. The method of claim 9, wherein the input is a gesture that the user begins to make and the depiction displays a full version of the gesture and changes that will occur if the gesture is completed.

14. The method of claim 9, wherein the first content is visible through the second content.

15. The method of claim 9, wherein the method further comprises: receiving an indication that the input is completed; and decreasing the visibility of the second content and increasing the visibility of the first content.

16. A computing system comprising:
a processor; and
computer storage memory having computer-executable instructions stored thereon which, when executed by the processor, implement a method of providing multiple channels of information at different depths, the method comprising:
(1) outputting a first content for display in a first three-dimensional volume defined, in part, by a first depth range;
(2) determining that a user has above a threshold probability of providing an input in the first content, wherein the input includes at least the user moving a hand towards an input button on a touch screen, wherein the above the threshold probability is based on a distance between the hand of the user and the input button, wherein the distance increases based on a past use of the input button by the user;
(3) before the input is provided, in response to the determination, decreasing a visibility of the first content, wherein the decreasing the visibility of the first content includes the first content being out of focus; and
(4) before the input is provided, outputting a second content for display in a second three-dimensional volume defined, in part, by a second depth range that is between the user viewing the second content and the first depth range, the second content providing a depiction of what will occur upon the user providing the input.

17. The system of claim 16, wherein the input is a current pose of the hand of the user landing on a touch screen at a point consistent with a current trajectory of the hand of the user.

18. The system of claim 16, wherein the input is a gesture that the user begins to make and the depiction displays a full version of the gesture and changes that will occur if the gesture is completed.

19. The system of claim 16, wherein the first content is visible through the second content.

20. The system of claim 16, wherein the method further comprises: receiving an indication that the input is completed; and decreasing the visibility of the second content and increasing the visibility of the first content.

* * * * *